United States Patent
Laugen et al.

(10) Patent No.: US 12,029,167 B2
(45) Date of Patent: Jul. 9, 2024

(54) HEADER REEL ILLUMINATION

(71) Applicant: DEERE & COMPANY, Moline, IL (US)

(72) Inventors: Heather G. Laugen, Davenport, IA (US); Curtis R. Hammer, Bettendorf, IA (US)

(73) Assignee: DEERE & COMPANY, Moline, IL (US)

( * ) Notice: Subject to any disclaimer, the term of this patent is extended or adjusted under 35 U.S.C. 154(b) by 385 days.

(21) Appl. No.: 17/303,339

(22) Filed: May 27, 2021

(65) Prior Publication Data
US 2022/0377982 A1    Dec. 1, 2022

(51) Int. Cl.
| | |
|---|---|
| *A01D 57/02* | (2006.01) |
| *A01D 75/00* | (2006.01) |
| *B60P 3/00* | (2006.01) |
| *B60Q 1/26* | (2006.01) |
| *F21V 33/00* | (2006.01) |

(52) U.S. Cl.
CPC ............. *A01D 57/02* (2013.01); *A01D 75/00* (2013.01); *B60P 3/00* (2013.01); *B60Q 1/2661* (2013.01); *F21V 33/00* (2013.01); *B60Q 2800/20* (2022.05)

(58) Field of Classification Search
CPC .. B60Q 2800/20; A01D 75/00; A01D 75/185; A01D 57/02
See application file for complete search history.

(56) References Cited

U.S. PATENT DOCUMENTS

| | | | |
|---|---|---|---|
| 10,829,003 B2 | 11/2020 | Thunga Gopal et al. | |
| 11,659,787 B2* | 5/2023 | Missotten | A01D 57/04 701/50 |
| 11,747,539 B1 | 9/2023 | Kingman et al. | |
| 2020/0031270 A1 | 1/2020 | Beschorn et al. | |
| 2020/0344954 A1* | 11/2020 | Lommen | A01D 63/04 |
| 2020/0346579 A1 | 11/2020 | Demski et al. | |
| 2021/0055158 A1* | 2/2021 | Hunt | G01P 3/00 |
| 2021/0185876 A1* | 6/2021 | Hunt | A01D 57/02 |

FOREIGN PATENT DOCUMENTS

| | | | |
|---|---|---|---|
| DE | 102019007752 A1 | | 5/2021 |
| JP | 2006006319 A | | 1/2006 |

OTHER PUBLICATIONS

BISO 3D—Perfect in Details (PART1), [online], [published on Sep. 11, 2020]. Retrieved from the Internet <URL: https://www.biso.at/biso-news/biso-3d-perfect-in-details-part1-/>.
United States Notice of Allowance, U.S. Appl. No. 17/303,336, filed Jan. 18, 2024, 13 pages.

* cited by examiner

*Primary Examiner* — Julie A Bannan

(57) ABSTRACT

Systems, methods, and apparatuses for emitting light from a header reel are disclosed. More particularly, systems, methods, and apparatuses for selectively emitting light from different portions of a reel header are disclosed. In some implementations, light is selectively emitted from different parts of a reel header based on a position of the reel header. For example, light may be emitted based on a position of the portion of the reel header as the reel header is rotated. The emitted light provides for illumination and operator visualization during, for example, agricultural operations performed at night or during low ambient light conditions.

15 Claims, 14 Drawing Sheets

HEADER REEL ILLUMINATION

FIELD OF THE DISCLOSURE

The present disclosure relates generally to agricultural illumination.

BACKGROUND OF THE DISCLOSURE

Agricultural operations, such as harvesting, spraying, and planting, can be accomplish during daylight hours as well as during the night. Nighttime agricultural operations generally proceed with artificial illumination. The illumination, such as illumination produced onboard of an agricultural machine, such as a combine harvester, tractor, or implement, provides illumination that permits an operator to see the area where the agricultural operation is being performed. For example, in some instances, the generated illumination is directed to an area adjacent to the agricultural machine, which allows the operator to see the illuminated environment to provide situational awareness.

SUMMARY OF THE DISCLOSURE

A first aspect of the present disclosure is directed to a method of selectively providing illumination from a header reel. The method may include providing illumination from a portion of a header reel during a first amount of a rotation of the header reel and stopping illumination from the portion of the header during a second amount of rotation of the header reel.

The various aspects may include one or more of the following features. Providing illumination from a portion of a header reel during a first amount of a rotation of the header reel may include identifying when the portion of a header reel reaches a selected position and releasing at least a portion of the illumination from the header reel when the portion of header reel reaches the selected position. Stopping illumination from the portion of the header during a second amount of rotation of the header reel may include identifying when a portion of the header reel reaches a selected position and stopping release of at least a portion of the illumination from the header reel when the portion of the header reel reaches the selected position. The header reel may include a tilt switch. Providing illumination from a portion of a header reel during a first amount of a rotation of the header reel may include providing illumination when the tilt switch attains a first orientation. Stopping illumination from the portion of the header during a second amount of rotation of the header reel may include stopping illumination when the tilt switch attains a second orientation, different from the first orientation. Providing illumination from a portion of a header reel during a first amount of a rotation of the header reel may include identifying when the portion of a header reel reaches a selected position and releasing illumination from the header reel when the portion of the header reel is detected at the selected position. Stopping illumination from the portion of the header during a second amount of rotation of the header reel may include stopping illumination when a selected amount of rotation of the header reel has occurred. Stopping illumination from the portion of the header during a second amount of rotation of the reel header may include identifying when a portion of the reel header reaches a selected position and stopping release of the illumination from the header reel when the portion of the header reel is detected at the selected position. The illumination may be released from a bat tube of the header reel. The illumination may be released from a light source provided on a bat tube of the header reel. The illumination may be released from a reel finger of the header reel. The illumination may be released from an aperture formed in the reel finger. The illumination may be released along a length of the reel finger. The illumination may be released from an optical component of the reel finger. The optical component may be a light pipe. Providing illumination from a portion of a header reel during a first amount of a rotation of the header reel may include providing illumination from a light source provided in a bat tube of the header reel.

Other features and aspects will become apparent by consideration of the detailed description and accompanying drawings.

BRIEF DESCRIPTION OF THE DRAWINGS

The detailed description of the drawings refers to the accompanying figures in which.

DETAILED DESCRIPTION

Figure 1:
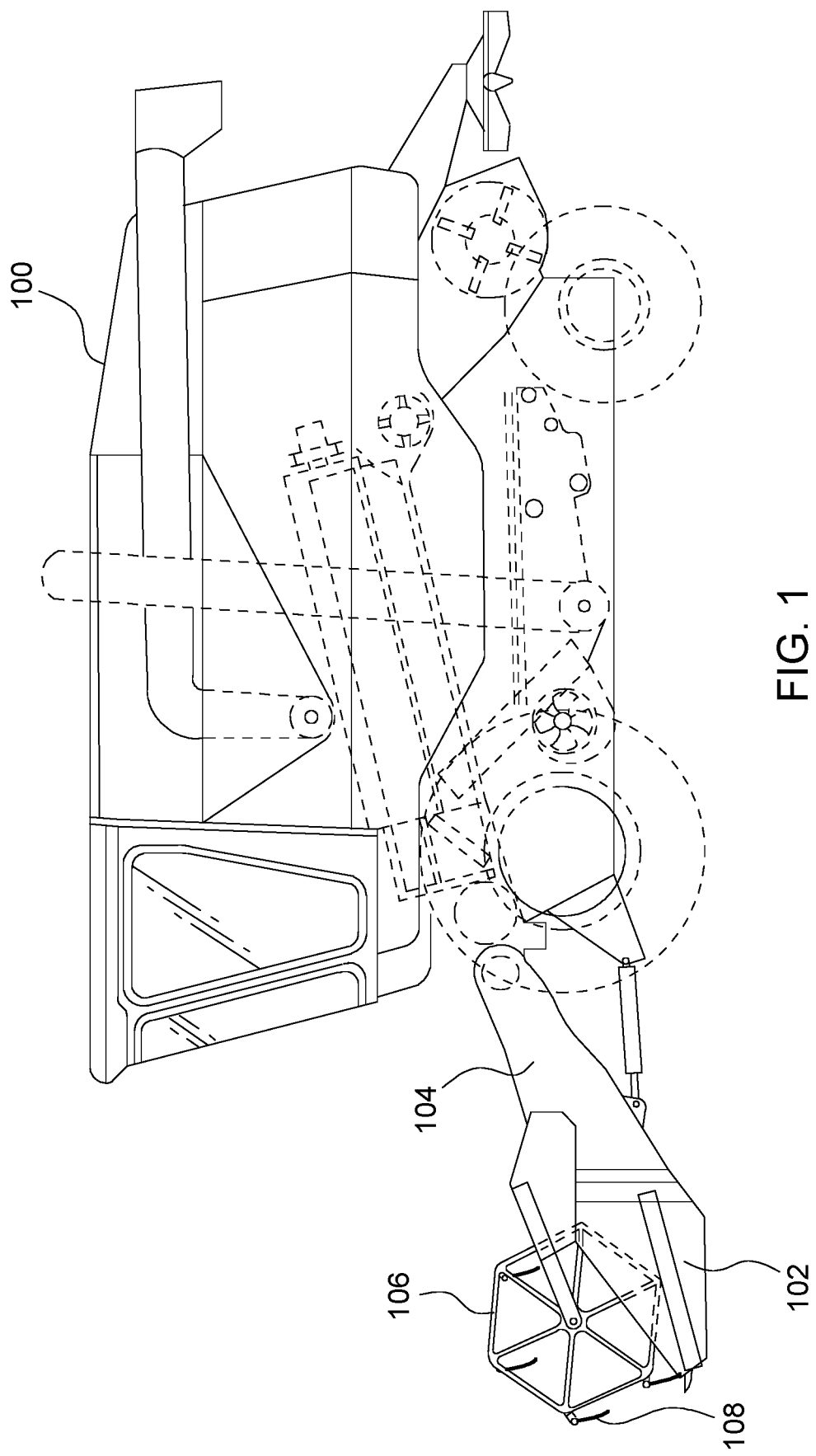
FIG. 1 is a side view of a combine harvester and a draper header attached at the feederhouse of the combine harvester, according to some implementations of the present disclosure.

For the purposes of promoting an understanding of the principles of the present disclosure, reference will now be made to the implementations illustrated in the drawings, and specific language will be used to describe the same. It will nevertheless be understood that no limitation of the scope of the disclosure is intended. Any alterations and further modifications to the described devices, systems, or methods and any further application of the principles of the present disclosure are fully contemplated as would normally occur to one skilled in the art to which the disclosure relates. In particular, it is fully contemplated that the features, components, and/or steps described with respect to one implementation may be combined with the features, components, and/or steps described with respect to other implementations of the present disclosure.

The present disclosure is directed to systems and methods for providing targeted illumination during an agricultural operation. More particularly, the present disclosure is directed to providing targeted illumination that is emitted from reel fingers. Illumination emitted from reel fingers allows an operator, such as an operator of an agricultural machine, such as a combine harvester, to see areas below and beyond the reel during nighttime operations. For example, illumination emitted from reel fingers is used to illuminate a portion of a header, such as a cutterbar of a head or an endless belt or an area adjacent to these portions. Further, in some instances, an area adjacent to these or other portions of the header are illuminated. The produced illumination allows the operator to see an area of the draper head that would otherwise be obscured. More particularly, traditional illumination produced during nighttime agricultural operations is produced by one or more light sources that is remote from the cutterbar, and a portion of the draper head or crops forms shadows that obstruct the produced light and limit what an operator is able to see as a result. Examples in the context of a draper header are provided. However, other types of headers having a header reel are within the scope of the present disclosure. Consequently, the scope of the present disclosure is not limited to draper headers but, rather, encompasses any type of header that includes a header reel, such as corn headers that include a reel.

Figure 2:
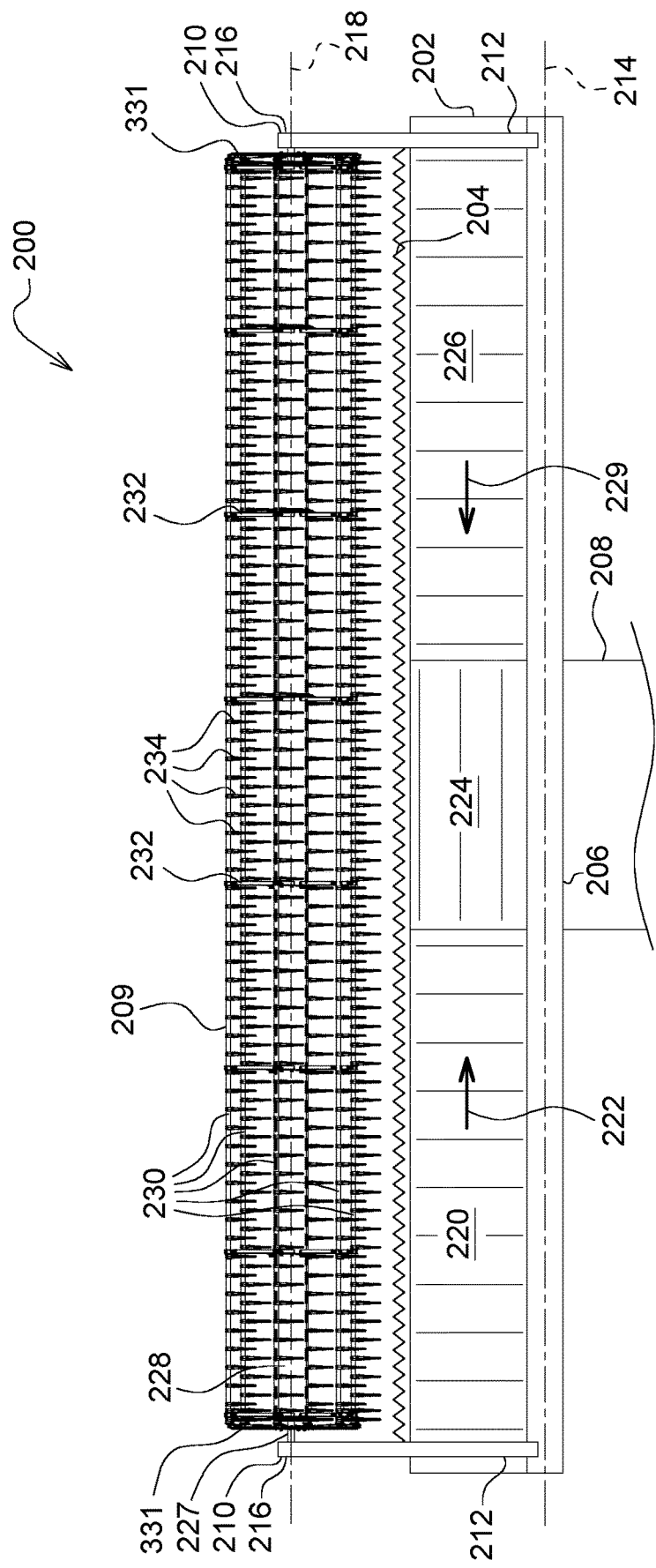
FIG. 2 is a top view of an example draper header 200, according to some implementations of the present disclosure.

FIG. 1 is a side view of a combine harvester 100 and a draper header 102 attached at the feederhouse 104 of the combine harvester 100. The draper header 102 includes a reel 106 that includes a plurality of reel fingers 108 that engage crop as the crop comes into contact with the draper header 102. FIG. 2 is a top view of an example draper header 200 that may be similar to the draper header 102. The draper header 200 includes a frame 202; a cutterbar 204 that extends laterally along the frame 202; an attachment portion 206 that couples the header 200 to a feederhouse 208 of an agricultural vehicle, such as a combine harvester; and a reel 209 that is pivotably coupled to the frame 202 via reel arms 210. The reel arms 210 are pivotably coupled to the frame at proximal ends 212 and are pivotable about an axis 214. The reel 208 is coupled to distal ends 216 of the reel arms 210 and is rotatable thereon about an axis 218.

The draper header 200 also includes a first endless belt 220 that transports severed crop material inwardly in a first direction 222 towards a center endless belt 224, and a second endless belt 226 that also transports severed crop material inwardly in a second direction 229 towards the center endless belt 224. The center endless belt 224 collects the severed crop material from the first and second endless belts 220 and 224 and transports the severed crop material aft to the feederhouse 208. Although the illustrated draper header 200 does not include pivotable wings or a reel having multiple sections, the scope of the present disclosure encompasses draper headers having wings and segmented reels as well as other types of draper headers.

The reel 208 includes a center tube 226, a shaft 227 extending from the center tube 228 that is coupled to the reel arms 210, reel ends 301, a plurality of bat tubes 230 that extend between the reel ends 301, and support arms 232 extending from the center tube 226 to the bat tubes 230. The reel 209 also includes a plurality of reel fingers 234 that extend in a cantilevered fashion from the bat tubes 230. Light is emitted from the reel fingers 234 to provide illumination of portions of the draper header 200 and, in some instances, an area adjacent to the draper header 200 during nighttime agricultural operations or at other times during low ambient light levels. In some implementations, light is emitted from all of the reel fingers 234. In other implementations, light is emitted from fewer than all of the light fingers.

In some implementations, the reel fingers 234 are coupled to the bat tubes 230 such that the reel fingers 234 and the associated bat tube 234 maintains a fixed orientation. As the reel 208 is rotated, the bat tubes 234 rotate relative thereto so that the reel fingers 234 maintain a downward pointing orientation. That is, as the reel 208 is rotated, the bat tubes 230 rotate relative thereto such that distal ends of the reel fingers 234 are directed downwards towards the cutterbar 204 of the draper header 200.

Figure 3:
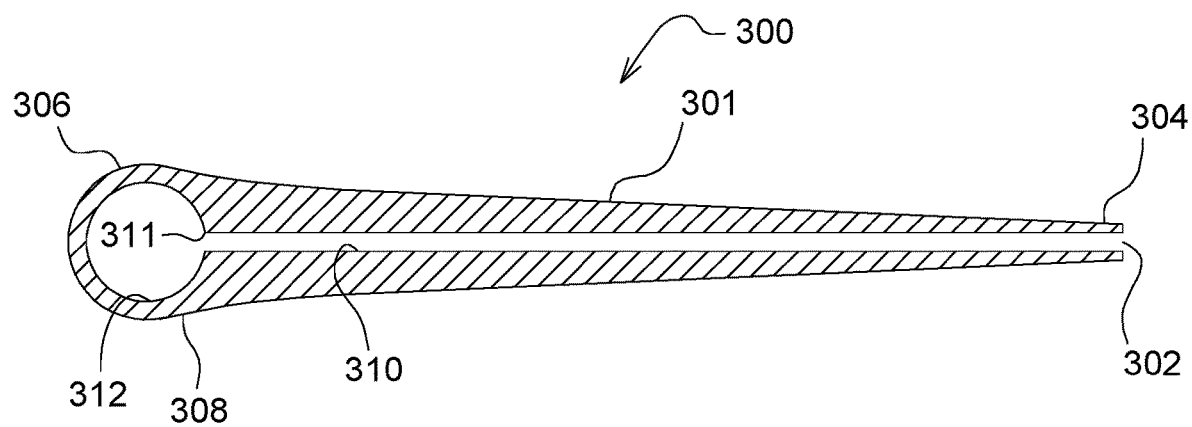
FIG. 3 a cross-sectional view of an example reel finger, according to some implementations of the present disclosure.

FIG. 3 is a cross-sectional view of an example reel finger 300, that may be similar to reel fingers 234. The reel finger 300 includes an elongated portion 301, an aperture 302 formed at a distal end 304 of the elongated portion 301, a mount portion 306 formed at a proximal end 308 of the elongated portion 301, and a cavity 310 that extends through the elongated portion 301 from the aperture 302 to an opening 311 formed adjacent to the mount portion 306. Thus, in the illustrated example, the opening 312, the aperture 302, and the cavity 310 that extends from the proximal end 310 to the distal end 304 of the reel finger 300. In other implementations, the aperture 302 can be provided at other locations along the reel finger 300. Moreover, in some instances, a plurality of apertures are formed in the reel finger 300 from which light is released.

Figure 4:
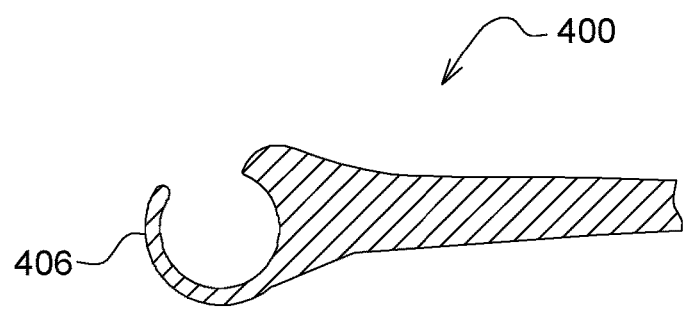
FIG. 4 is a detail view of a mount portion of an example reel finger, according to some implementations of the present disclosure.

The mount portion 306 functions to couple the reel finger 300 to a bat tube of a reel, such as bat tube 230 shown in FIG. 2. In the illustrated example, the mount portion 306 defines a circular opening 312. However, in other implementations, the mount portion 306 includes other geometries or openings having different shapes. For example, in some implementations, mount 406 of reel finger 400 defines an arcuate or circular shape that is not fully closed, as shown in FIG. 4.

Figure 5:
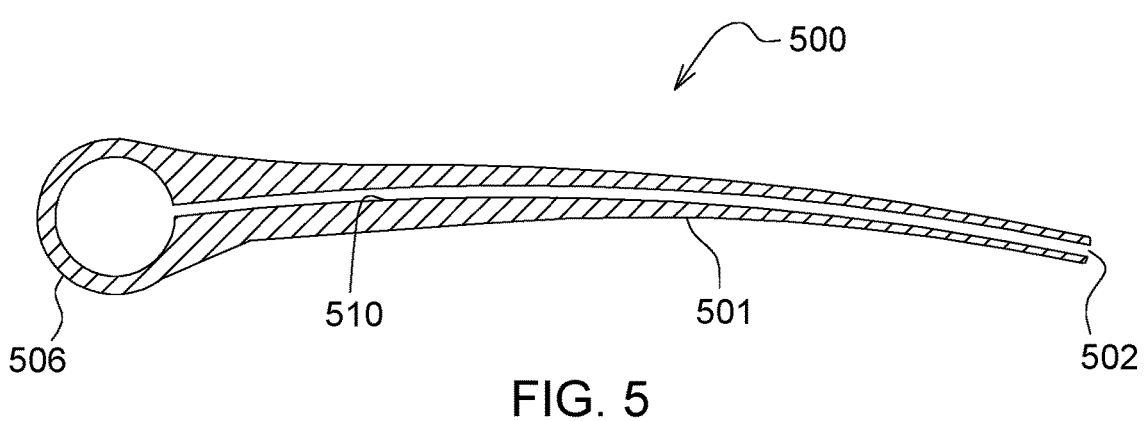
FIG. 5 is a cross-sectional view of another example reel finger, according to some implementations of the present disclosure.

FIG. 5 shows another example reel finger 500 having an elongated portion 501 with a curved shape. The reel finger 500 also includes an aperture 502, a mount 506, and a cavity 510 extending through the elongated portion 501. Thus, the present disclosure encompasses reel fingers having a straight shape, a curved shape, or another type of shape.

Figure 6:
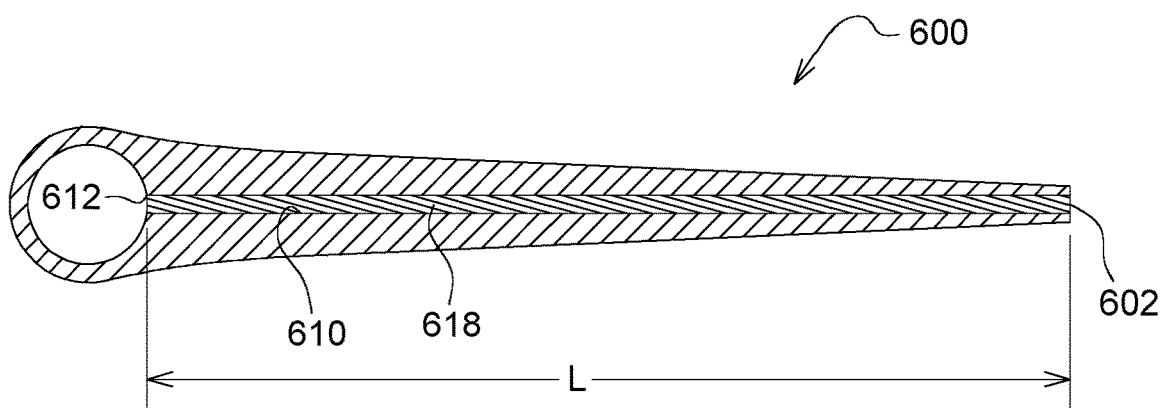
FIG. 6 is a cross-sectional view of another example reel finger having an optical component disposed in a cavity, according to some implementations of the present disclosure.

In some implementations, an optical component is disposed in the cavity formed in the reel finger. The optical component transmits light generated by a light source through the reel finger to the aperture from which the generated light is emitted. In some instances, the optical component is a light pipe 614 that extends along an entirety of the cavity 610 of reel finger 600, from opening 612 to aperture 602, as shown, for example, in FIG. 6. In some implementations, the light pipe 614 extends less than an entirety of length L of the cavity 610. In some implementations, a size, e.g., diameter of the light pipe 614 is less than a size, e.g., diameter, of the cavity 610. In some implementations, an outer surface of the 616 of the light pipe 614 contacts an inner surface 618 of the cavity 610. In the illustrated example, light is received by the light pipe 614 at the opening 612 and is transmitted along the light pipe 614 to the aperture 602, where the light is emitted to provide illumination. In some instances, generated light is transmitted through an optical component, such as a light pipe, extending through a bat tube to which the reel finger is attached.

A benefit provided by the reel finger 600 is that, should the reel finger 600 become damaged, such as by being cut or severed by a cutterbar of an associated draper header, illumination continues to be released from the light pipe 614 notwithstanding the damage. Damage to reel finger 600 does not result in damage to the light source providing illumination to the light tube 614. Consequently, should one or more reel fingers 600 become damaged during the course of a harvesting operation during the night, illumination continues to be provided, allowing the harvesting operation to continue unaffected.

Figure 16:
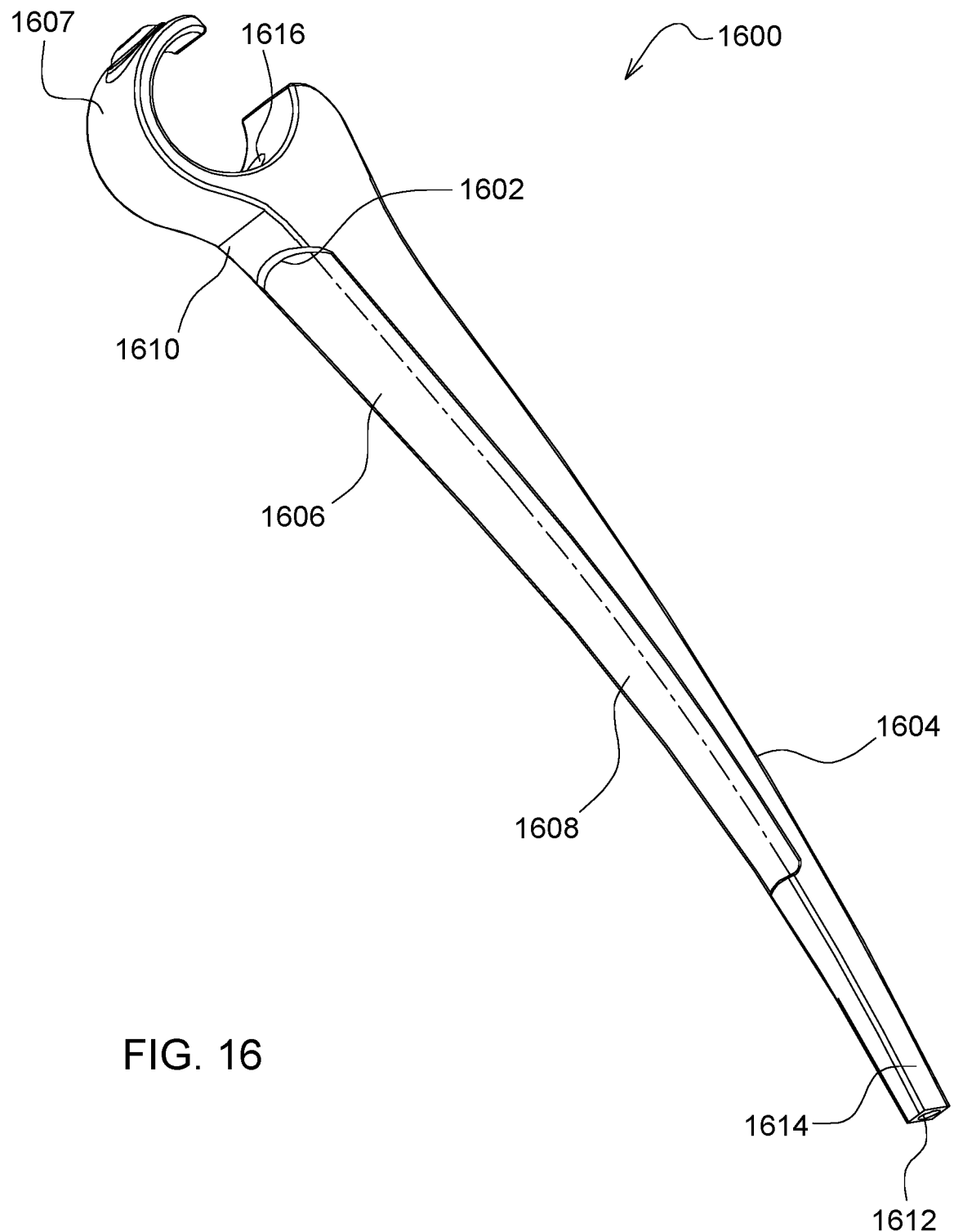
FIG. 16 is a perspective view of another example reel finger that defines a cavity extending along an elongated portion thereof, according to some implementations of the present disclosure.

Although the reel finger 600 illustrates the cavity 610 as being enclosed, in other implementations, the cavity 610 may be open along all or a portion of a length of the cavity 160. FIG. 16 is a perspective view of another example reel finger 1600 that defines a cavity 1602 extending along an elongated portion 1604 of the reel finger 1600. An optical component 1606 (e.g., a light pipe) is disposed in the cavity 1602. A mount portion 1607 is formed at a proximal end 1610 end of the elongated portion 1604 and is used to attach the reel finger 1600 to a bat tube of a reel of a draper header. An aperture 1612 is formed at a distal end 1614. Light transmitted through the optical component 1606 is released through the aperture to provide illumination. An aperture 1616 is formed at the proximal end adjacent to the mount portion 1607. In some implementations, the aperture 1616 receives a light source, such as an LED or other lighting technology. In other implementations, the aperture 1616 provides optical communication in which light from one source, such as a light source or another optical component, is transmitted to the optical component 1606 for transmission to the aperture 1612 for illumination.

In this example, the cavity 1606 is partially enclosed such that a portion of the cavity 1602 and, hence, the optical component 1604, is exposed along a length of the elongated portion 1602 of the reel finger 1600. As a result, a portion 1608 of the optical component 1606 that faces an aft direction, such as towards an operator cab of a vehicle carrying the draper header, is exposed. The exposed portion 1608 of the optical component 1606 emits light that further assist in illuminating a portion of the draper header, such as the cutterbar, an area adjacent to the draper header, or both. In some instances, the aperture 1612 is omitted and illumination provided by the optical component 1606 is provided from the exposed portion 1608 of the optical component 1606.

In other implementations, a portion of a cavity formed in a reel finger that faces a forward direction is removed, exposing a portion of an optical component (e.g., a light pipe) extending therethrough. As a result, a portion of the light passing through the optical component is released in a forward direction. This portion of light projects forward of the draper header, marking a presence of the draper header and, hence, the agricultural vehicle in a dark field. Thus, in such instances, the reel fingers further represent a safety feature, particularly for others remote from the draper header, such as pedestrians or operators of other vehicles.

Figure 7:
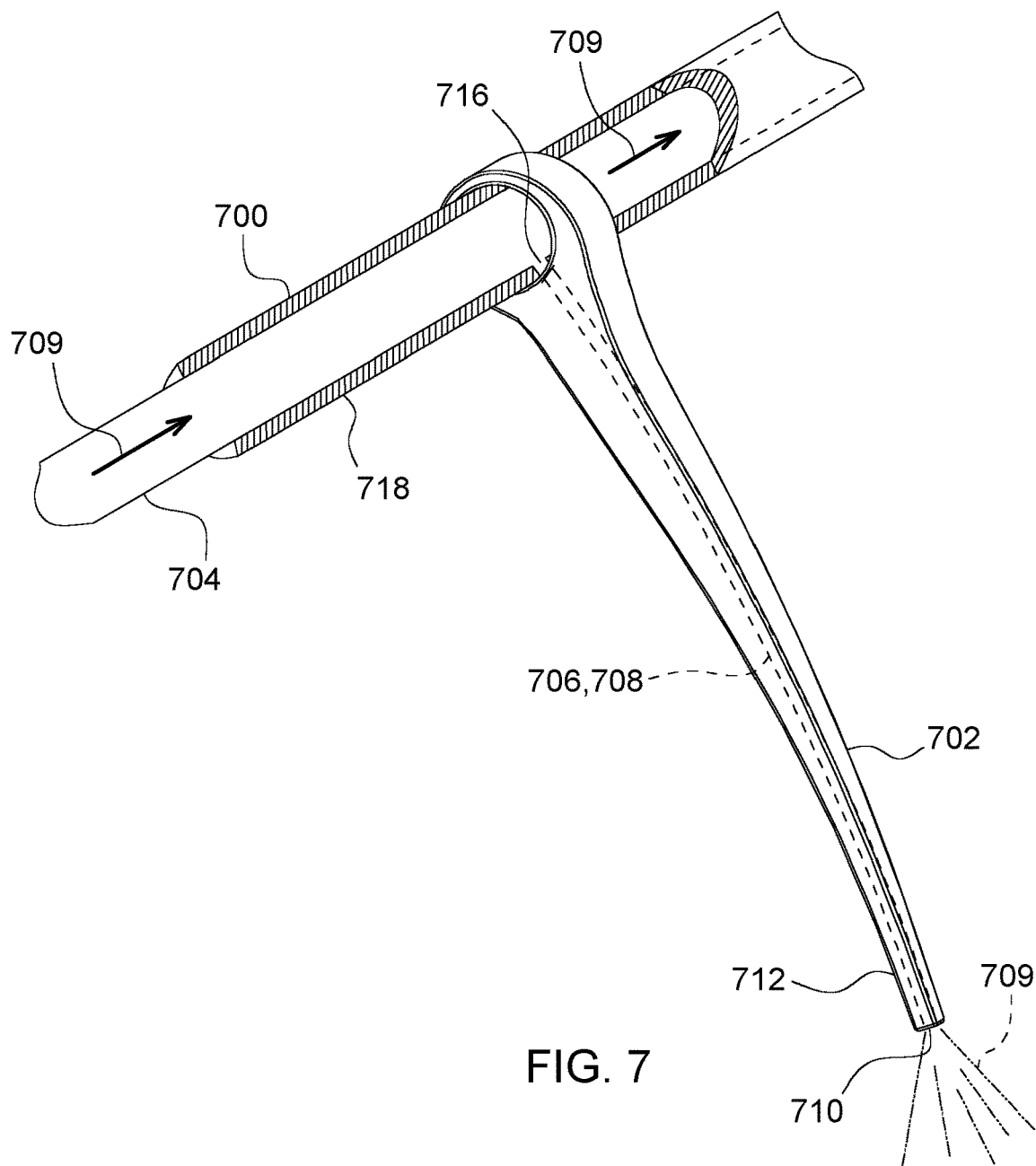
FIG. 7 is a detail, partial cross-sectional view of a portion of a bat tube and a reel finger attached thereto, according to some implementations of the present disclosure.

FIG. 7 is a detail view of a portion of a bat tube 700 and a reel finger 702 attached thereto. An optical component 704 extends through the bat tube 700 and distributes light to the optical component 706 extending through a cavity 708 formed in the reel finger 702. Light 709 transmitted to the optical component 704 is released from an aperture 710 formed in the distal end 712 of the reel finger 702 to provide illimination. Light 709 continues along the optical component 704 for distribution at other reel fingers connected to bat tube 700. In some implementations, one or both of the optical components 704 and 706 are light pipes. Rigid or flexible light pipes can be used. In some implementations, one or both of the optical components are light pipes in the form of optical fibers. Still further, other types of optical components for transmitting light can be used. In some implementations, light is transmitted from the optical component 704 to the optical component 706 via an opening 716 formed in a wall 718 of the bat tube 700.

Figure 8:
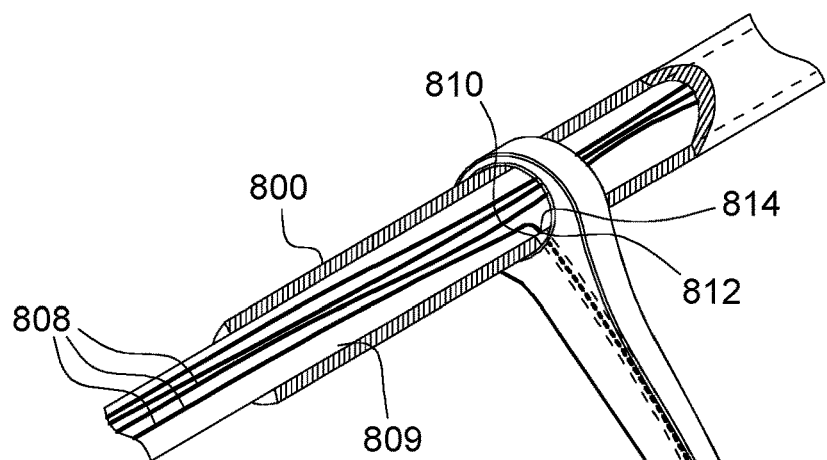
FIG. 8 is a detail, partial cross-sectional view of a portion of another bat tube and a reel finger coupled thereto, according to some implementations of the present disclosure.

FIG. 8 is a detail, partial cross-sectional view of a portion of a bat tube 800 and a reel finger 802 coupled thereto. The reel finger 802 defines a cavity 804 in which an optical component 806 is disposed. In some instances, the optical component 806 is a light pipe, an optical fiber, or other type of material that transmits light along the cavity 804. Light is transmitted along the bat tube 800 via optical fibers 808 extending through a cavity 809 formed in the bat tube 800. The light passing through the optical fibers 808 is transmitted to the optical component 806 through an opening 810 formed in the bat tube 800. In the illustrated example, an end 812 of the optical fiber 808 is located adjacent to an end 814 of the optical component 806, and light is transmitted from the end 812 of the optical fiber 808 to the end 814 of the optical component 806. Light is emitted from an aperture 816 formed in the reel finger 802. Further, with this type of construction, reel finger 802 is able to be quickly replaced in case of damage, for example.

In the illustrated example of FIG. 8, a single optical fiber 808 is used to transmit light to each of the reel fingers 802 coupled to the bat tube 800. In other implementations, two or more optical fibers are used to transmit light to the reel finger 802. In still other implementations, a single optical fiber is used to transmit light to each of the reel fingers coupled to a bat tube.

In some implementations, an optical component may include or have a lens formed therein in order to provide a desired amount of light distribution when the produced light is emitted from the reel fingers. Further, where a light source is provided in a reel finger, the light source may have or include a lens for focusing the light to a desired amount.

Figure 9:
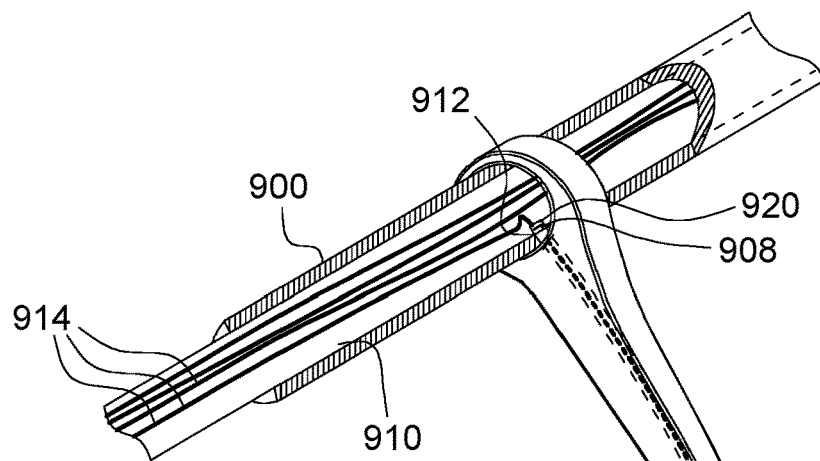
FIG. 9 is a detail, partial cross-sectional view of a portion of another bat tube and a reel finger coupled thereto, according to some implementations of the present disclosure.

FIG. 9 is a detail view showing a portion of another example bat tube 900 and reel finger 902 attached to the bat tube 900. An optical component 904 extends through a cavity 906 formed in the reel finger 902. The bat tube 900 includes a light source 908 disposed in a cavity 910 formed through the bat tube 900. The light source 908 is disposed at an opening 912 formed in the bat tube 900 adjacent a location where the reel finger 902 is attached to the bat tube 900. The light source 908 can be any of a number of different lighting technologies. Example lighting technologies include a light emitting diode (LED), incandescent bulb, compact fluorescent light bulb (CFL), and halogen bulb. Other types of light generating technologies may also be used and are within the scope of the present disclosure. In this example, the light source 908 is an LED, and power is provided to the LED via an electrical connection 914 that extends through the cavity 910 and electrically coupled to the LED. In some implementations, the electrical connection 914 is one or more electrical wires coupled to the light source 908. The light source 908 and, in this example, LED, is located adjacent an end 916 of the optical component 904. Electrical power is provided to the light source 902 to produce light. The light is transmitted to the optical component 904, through the optical component 904, and out of the reel finger 902 via an aperture 918 formed in the reel finger 902.

In some implementations, the light source 908 is capable of generating different colors of light. For example, where the light source 908 is an LED, the LED can be a multicolor LED capable of generating different colors of light. In some instances, the light source 908 includes logic that may be implemented in the form of electronics 920 that are onboard of the light source 908 or located remote from the light source 908. For example, in some instances, the electronics may be coupled to or otherwise located with the light source 908; located at another location on the draper header; elsewhere on a vehicle transporting the draper header, e.g., a combine harvester; or offboard of the draper header and vehicle carrying the draper header. In some implementations, the LED is a 5050 surface mounted diode (SMD) LED. However, other types of LEDs can be used and are within the scope of the present disclosure.

FIG. 9 show electronics 920 included with the light source 908. A signal transmitted to the electronics 920, such as through electrical connection 914, causes the light source 908 to generate a color of light corresponding to the received signal. For example, in some implementations, a first signal indicates that normal operation, such as normal operation of a combine harvester or draper header, is occurring. In such a case, the first signal causes the light source 908 to produce light having a first color, such as a white color.

Light emitted from the reel fingers is generally directed towards the cutterbar of the draper head or an area adjacent to the draper header that provides an operator with situational awareness of the illuminated area. This light provides illumination that otherwise is not available when a light source is provided aft of the draper header. In such instances, light generated by light sources aft of the draper header is obstructed, such as by a portion of the draper header, a vehicle transporting the draper header, or crops. As a result of the obstruction, shadows result, obstructing the view of portions of the draper header, particularly the cutterbar and adjacent areas. With light emitted from the reel fingers, the operator is able to see, during nighttime operations, a condition of the cutterbar, another portion of the draper header, an area adjacent to the draper header, or a combination of these, for example.

When an event occurs, such as when an error is detected, a second signal is transmitted to the electronics that causes the LED to generate a second light color, such as red. The produced light is emitted from the reel fingers. An operator in a cab of a combine, for example, would see the color change and be able to recognize that an event has occurred based on the color of light being produced and, in some instances, recognize the nature of the event based on the color of light produced. In some implementations, multiple events are contemplated, and a different light color, pattern of light, or light scheme (e.g., flashing lights) is associated with each event. Consequently, the operator is able to detect an event and the type of event based on, for example, the color of produced light emitted from the reel fingers without having to direct the operator's attention to another location, such as to a control panel within the cab. Thus, the operator's attention is maintained outside of the cab and into the field, providing the operator with improved situational awareness.

In some implementations, the electronics 920 is or forms part of a computer system, such as the computer system 1400 described in more detail below. Further, the electrical connection 914 includes one or more electrical wires used to transmits electrical power, one or more electrical signals, or both to the electronics 920, light source 908, or both, such as when the electronics are located remote from the light source 908.

Figure 10:
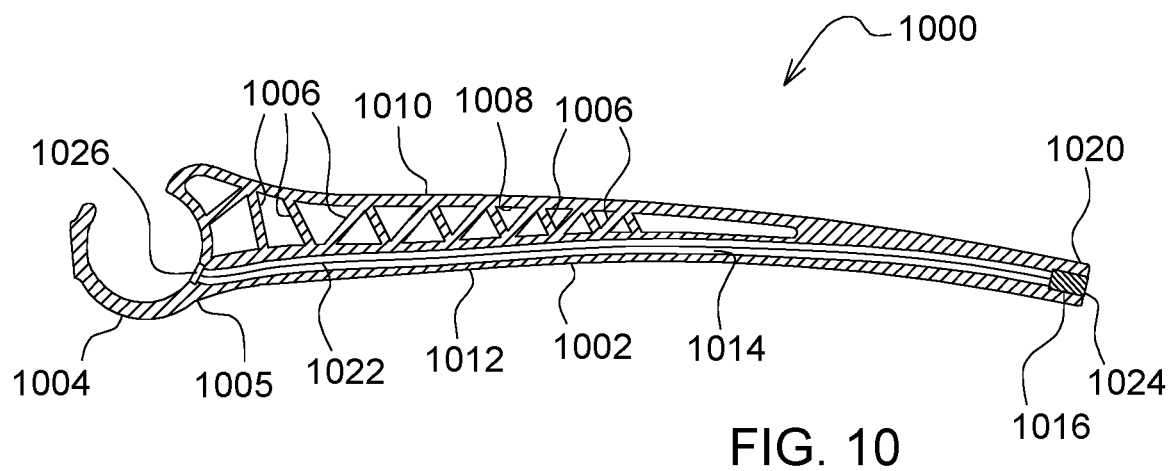
FIG. 10 is a cross-sectional view of another example reel finger, according to some implementations of the present disclosure.

In still other implementations, a light source, such as an LED, is disposed within the reel finger, such as at the distal end of the reel finger. FIG. 10 is a cross-sectional view of another example reel finger 1000. The reel finger 1000 includes an elongated portion 1002 and a mount portion 1004 formed at a proximal end 1005 of the elongated portion 1002. The elongated portion 1002 includes a plurality of webs 1006 disposed across in an opened portion 1008. The webs 1006 extend between flanges 1010 and 1012. A cavity 1014 extends through the flange 1012, and a light source 1016 is disposed in the cavity 1014. In the illustrated example, the light source 1016 is located adjacent to an aperture 1018 formed at a distal end 1020 of the elongated portion 1002. An electrical connection 1022 couples the light source to a power source for providing electrical power to the light source 1016. Light produced by the light source 1016 is emitted from the reel finger 1000 via an aperture 1024 formed at the distal end 1020 of the reel finger 1000.

As explained earlier, the light source 1016 may be a light source capable of generating multiple colors of light. Also similarly, the light source 1016 may be controlled by electronics (which may be similar to electronics 920 described earlier) provided on the reel finger 1000 or remote from the reel finger 1000, such as elsewhere on a draper header, on an agricultural vehicle coupled to the draper header, or offboard of the agricultural vehicle. The reel finger 1000 includes an electrical connection 1026 that mates with a corresponding connector portion on a bat tube. As a result, the reel finger 1000 is able to be quickly connected or disconnected. Consequently, if a reel finger requires replacement, such as due to damage, the reel finger is quickly disconnected, severing the electrical connection, and a new reel finger attached to the bat tube, re-establishing the electrical connection. In this way, reel fingers are quickly connected or disconnected from the reel.

Figure 11:
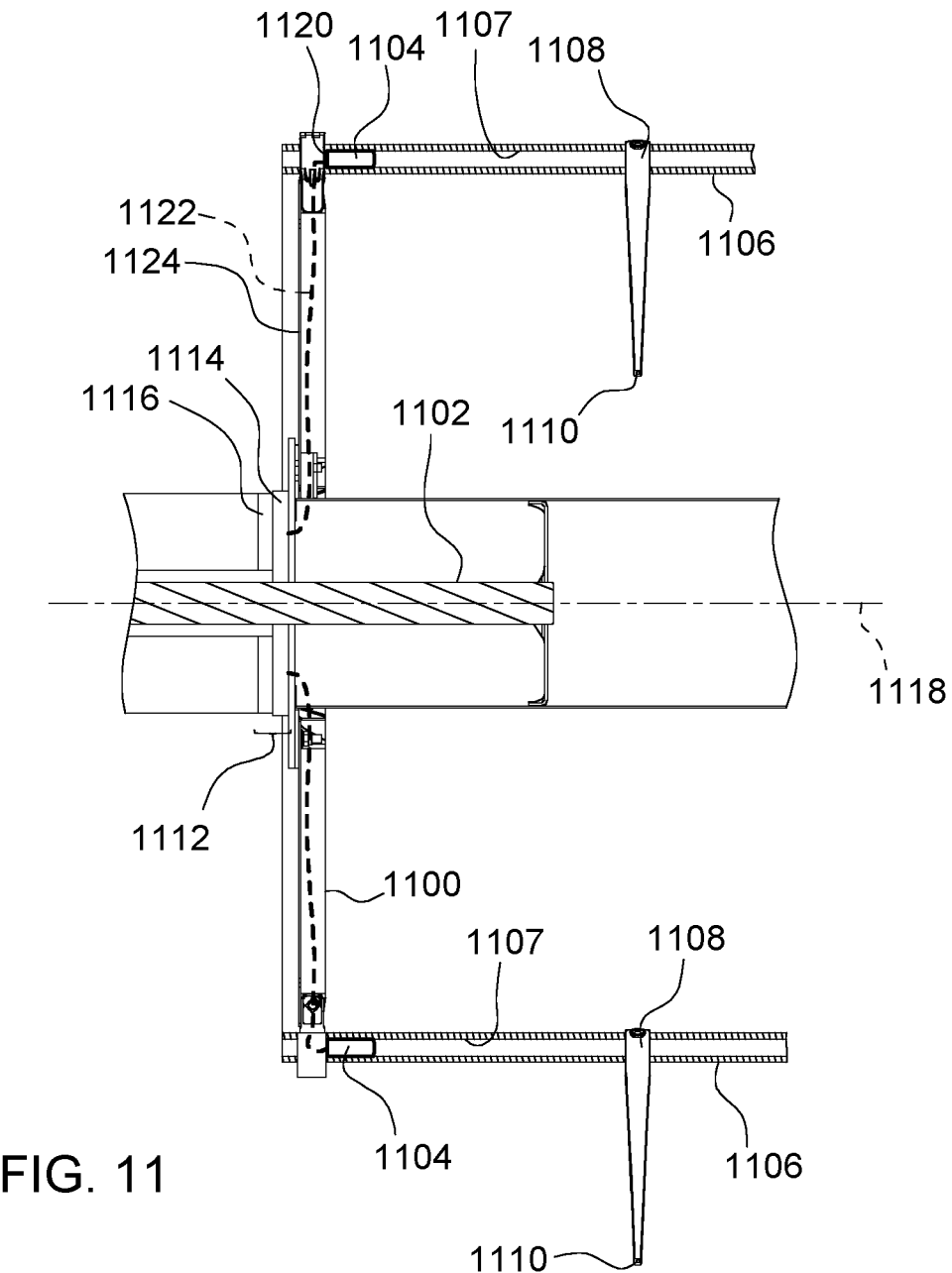
FIG. 11 is a detail view of a portion of an example reel, according to some implementations of the present disclosure.

FIG. 11 illustrates an example implementation in which a light source is provided in a bat tube that is used to provide illumination to a plurality of reel fingers coupled to the bat tube. Referring to FIG. 11, a reel 1100 is coupled to a shaft 1102, and the reel 1100 and shaft 1102 are rotatable together. A light source 1104 provided in each of bat tubes 1106. Particularly, the light sources 1104 are provided in cavities 1107 formed in the bat tube 1106. The light sources 1104 generate light that is transmitted to all or a portion of reel fingers 1108 coupled to the respective bat tubes 1106 via a common optical component (e.g., a common light pipe or optical fiber) or a plurality of optical components, such as a plurality of light pipes or optical fibers. In some implementations, a light pipe formed of polymethyl methacrylate (PMMA) is used. However, the scope of the present disclosure is not so limited. Rather, optical components, including light pipes, within the scope of the present disclosure include those formed of other types of material. The light generated by the light sources is conducted through the reel fingers 1108, such as in a manner described herein or otherwise within the scope of the present disclosure, and emitted from an aperture 1110 formed in the reel fingers 1108. In this example, a single aperture 1110 is formed in each reel finger 1108. In other implementations, one or more of the reel fingers 1108 includes a plurality of apertures from which the produced light is emitted.

Electrical power can be provided to the light sources 1104 in a variety of ways. For example, in the illustrated example of FIG. 11, electrical power is provided to the light sources 1104 via a slip ring connection 1112. A slip ring connection involves a first disc 1114 that has one or more concentric rings formed on a surface of the first disc 1114. A second ring 1116 similarly includes one or more concentric rings formed on a surface thereof that are in contact with the counterpart one or more concentric rings formed on the first disc 1114. The rings are formed of an electrically conductive material that conducts electricity from the first disc 1114 to the second disc 1116 and vice versa. Thus, as the discs 1114 and 1116 move relative to each other about a common central axis 1118 of the discs 1114 and 1116, electrical connection is maintained by contact provided between the counterpart rings formed in each of the discs 1114 and 1116. In this example, the central axis 1118 is an axis of rotation about which the reel 1100 is rotated. In this example, the ring 1114 is coupled to and rotates with the reel 1100 and the ring 1116 is maintained in a non-rotating condition relative to the reel 1100. In some implementations, a slip ring is also provided at an interface 1120 between the electrical connection 1122 and the light source 1104. In such instances, the bat tubes 1106 are rotating relative to reel end 1124.

In other implementations, a reel includes a power generation device that provides electrical power to light sources provided onboard of the reel. For example, in some instances, the reel includes a generator, such as a DC generator, or dynamo that generates electrical power. In some instances, the power generation device utilizes rotation of the reel to generate the electrical power used to operate the light sources.

Figure 15:
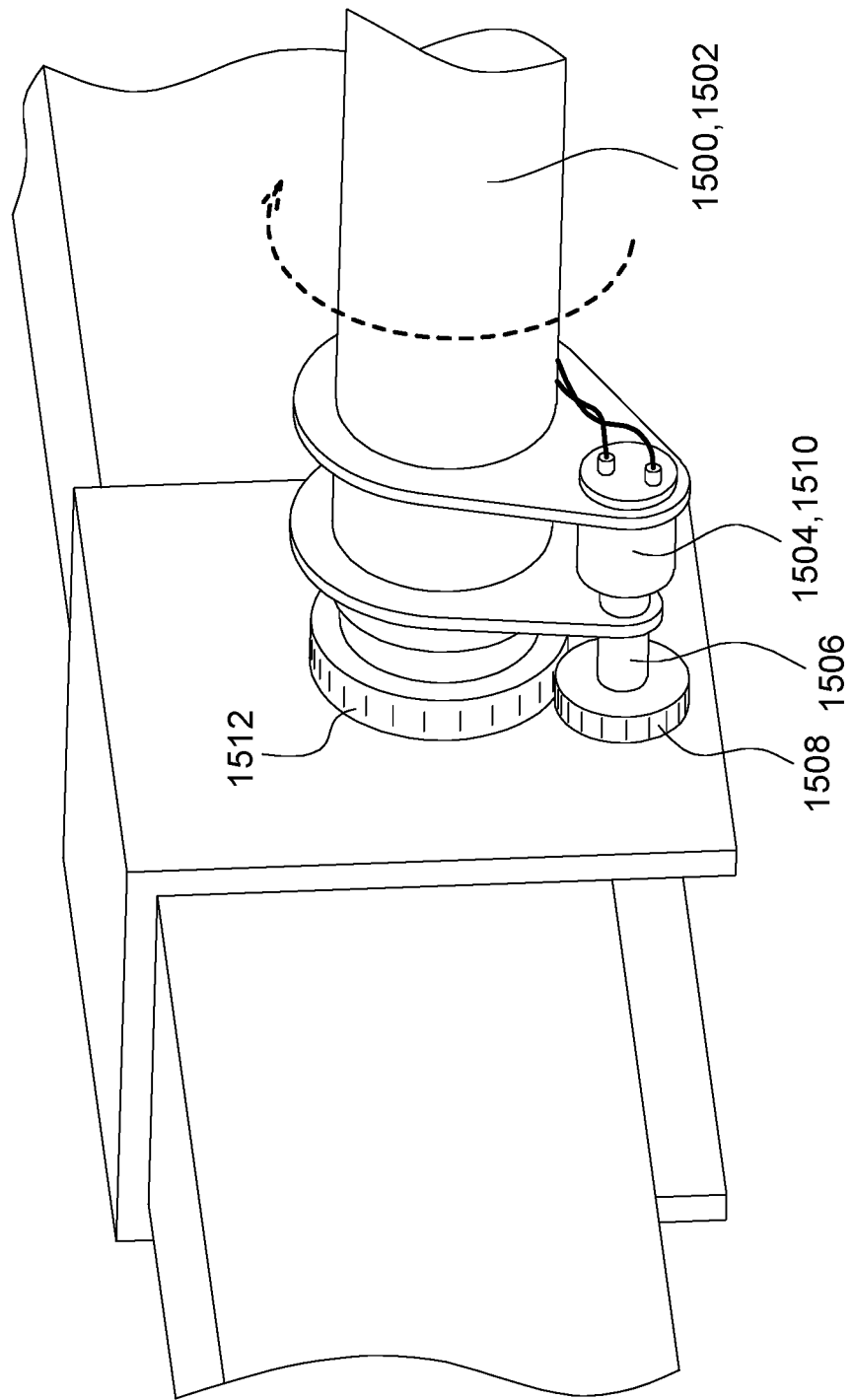
FIG. 15 is a detail view of a generator coupled to a center tube of a reel to generate electrical power using a rotating movement of the reel, according to some implementations of the present disclosure.

FIG. 15 is a perspective view of a portion of an example reel 1500. The reel 1500 includes a center tube 1502 and a generator 1504 coupled to the center tube 1502 and rotatable therewith. The generator 1504 includes a first portion 1506 having a rotatable wheel 1508 and a second portion 1510. The first portion 1506 is rotatable relative to the second portion 1510. The wheel 1508 engages a cylindrical portion 1512 of reel 1500. In other implementations, the cylindrical portion 1512 may form part of a mounting bracket the supports the reel 1500 on a draper header. In this example, the center tube 1502 rotates relative to the cylindrical portion 1512. The second portion 1510 is secured to the center tube 1502 such that the center tube 1502 and the second portion 1510 rotate together. As the center tube 1502 rotates relative to the cylindrical portion 1510, engagement between the wheel 1508 and, consequently, the first portion 1508 relative to the second portion 1510 generates electricity that is used to power one or more light sources used to provide illumination from one or more reel fingers of the reel 1500.

Figure 12:
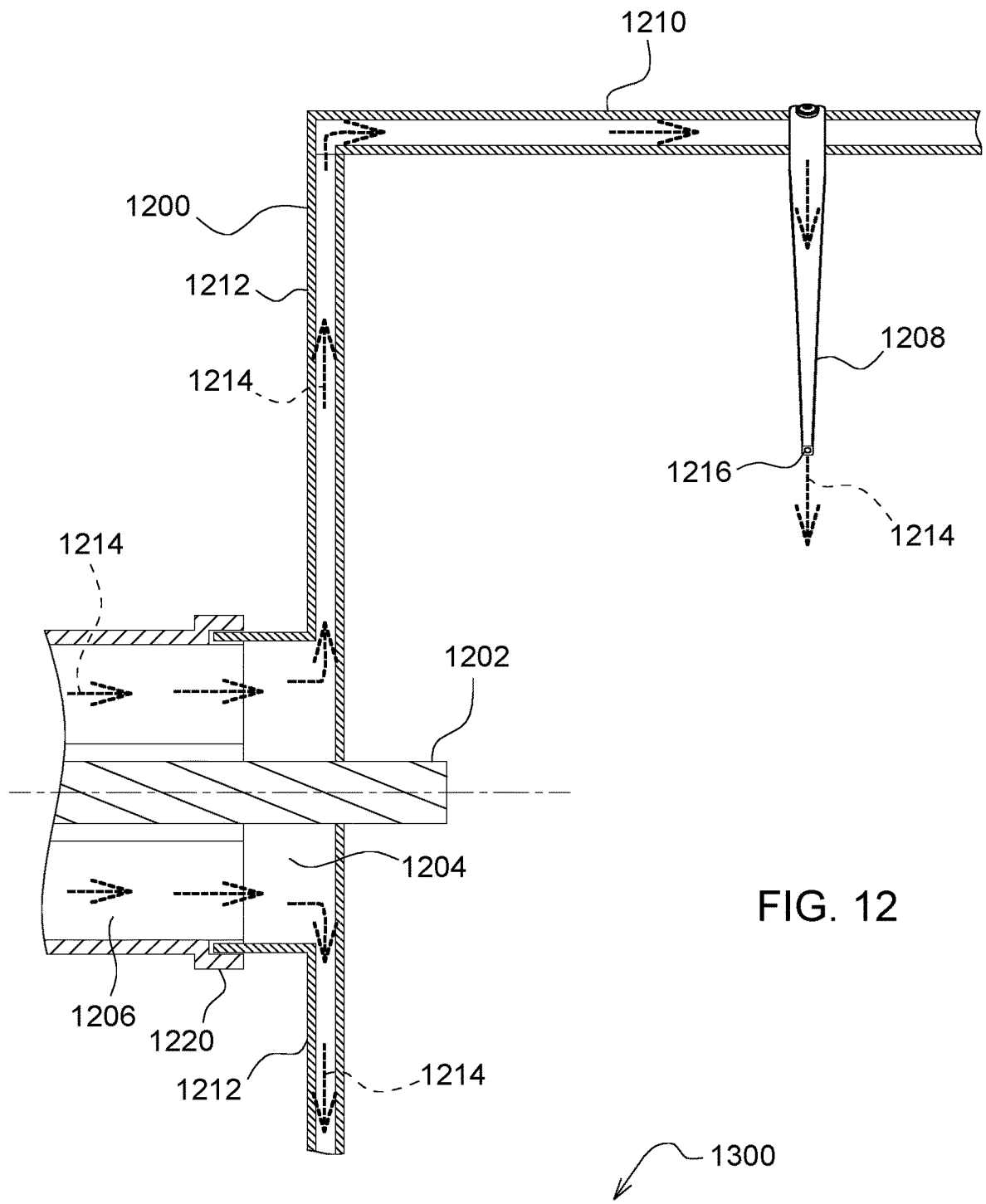
FIG. 12 is a detail view of a portion of another example reel, according to some implementations of the present disclosure.

FIG. 12 shows another implementation in which light is generated offboard of the reel and transmitted to the reel for distribution to the different reel fingers for subsequent release therefrom. Referring to FIG. 12, a reel 1200 is coupled to a shaft 1202. In this example, the shaft 1202 and reel 1200 rotate together. The reel 1200 includes an optical component 1204 disposed circumjacent to the shaft 1202. The optical component 1204 includes an annular portion that partially or fully encircles the shaft 1202. The optical component 1202 receives light from a light source form light source 1206. In some implementations, the optical component 1204 receives produced light directly from a light source, such as light source 1206 or indirectly via another optical component that does not rotate with the reel 1200 and that is optically coupled to the optical component 1204. In some implementations, the light source 1206 includes a plurality of light sources that are arranged in an annular fashion to provide light to the optical component 1204. The optical component transmits the produced light to reel fingers 1208 provided on each bat tube 1210 of the reel 1200. In the illustrated example, the optical component 1204 extends through arms 1212 of the reel 1200 to the bat tubes 1210 coupled respectively thereto. The produced light is transferred into the bat tubes 1210 and onto the reel fingers 1208 in a manner as described herein or otherwise within the scope of the present disclosure. In other implementations, the optical component 1204 transmits the produced light to separate optical components that extend through each of the arms 1212, such as one or more light pipes or optical fibers. In some implementations, one or more optical fibers are used to transmit the produced light from the optical component 1204 to bat tube 1210 or to each of the reel fingers 1208. For example, in some instances, an individual optical fiber is used to transmit light to each individual reel finger 1208. In other implementations, a single optical fiber or single light pipe is used to transmit the produced light to all or a portion of the reel fingers 1208 provided on a bat tube 1210. Light is conducted through the reel fingers 1208, such as in a manner described herein, and emitted from apertures 1216 formed in the reel fingers 1208, such as at a distal end 1218 of the reel fingers 1208. Arrows 1214 illustrate a path that the produced light travels from the light source 1206 to the aperture 1216.

A shroud 1220 is provided around the light source 1206, an interface between the light source 1206 and the optical component 1204, or both to reduce or eliminate light release from the reel at the interface between the light source 1206 and optical component 1204. Reducing or eliminating light released at this location avoids light that may produce glare or otherwise present a distraction to an operator.

Figure 13:
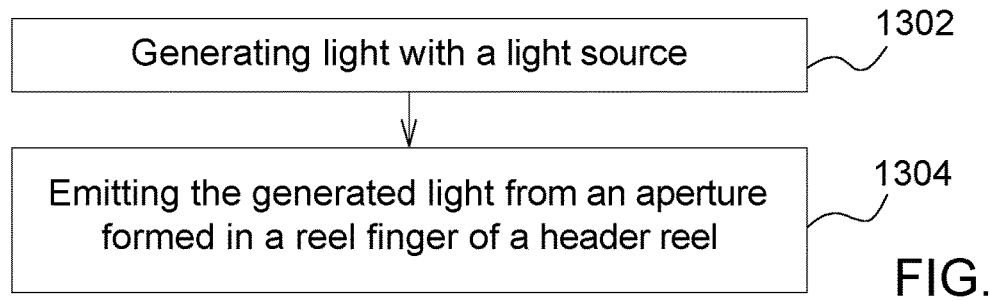
FIG. 13 is a flowchart of an example method for emitting light from reel fingers of a draper header reel, according to some implementations of the present disclosure.

FIG. 13 is a flowchart of an example method 1300 for providing illumination via a header reel. At 1302, light is generated with a light source. In some implementations, the light source can be provided at any number of locations, such as within a reel finger, within a bat tube of a reel, or external to the reel. At 1304, the generated light is emitted from an aperture formed in a reel finger of a header reel.

Figure 17:
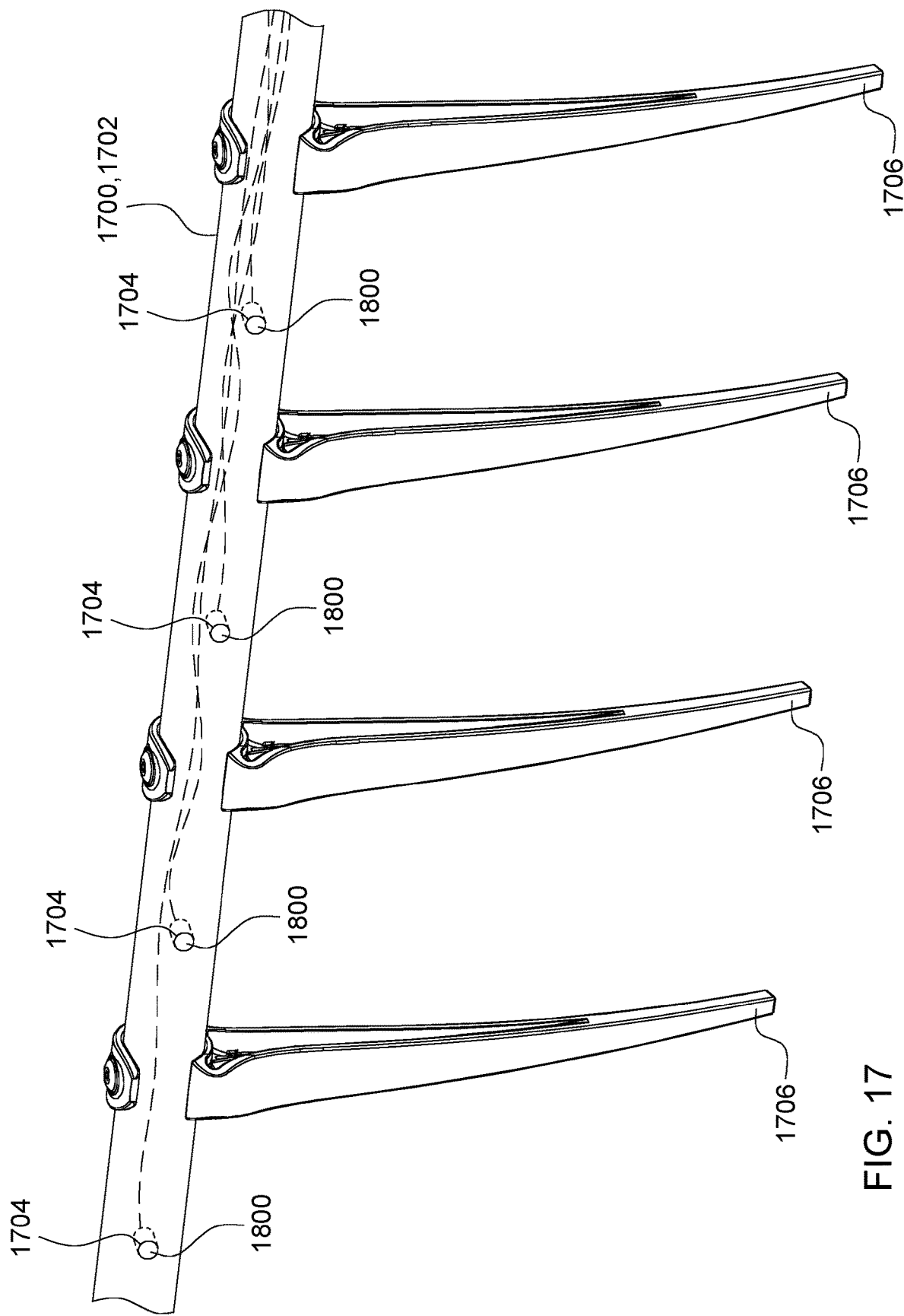
FIG. 17 is a detail view of a portion of an example reel, according to some implementations of the present disclosure.
Figure 18:
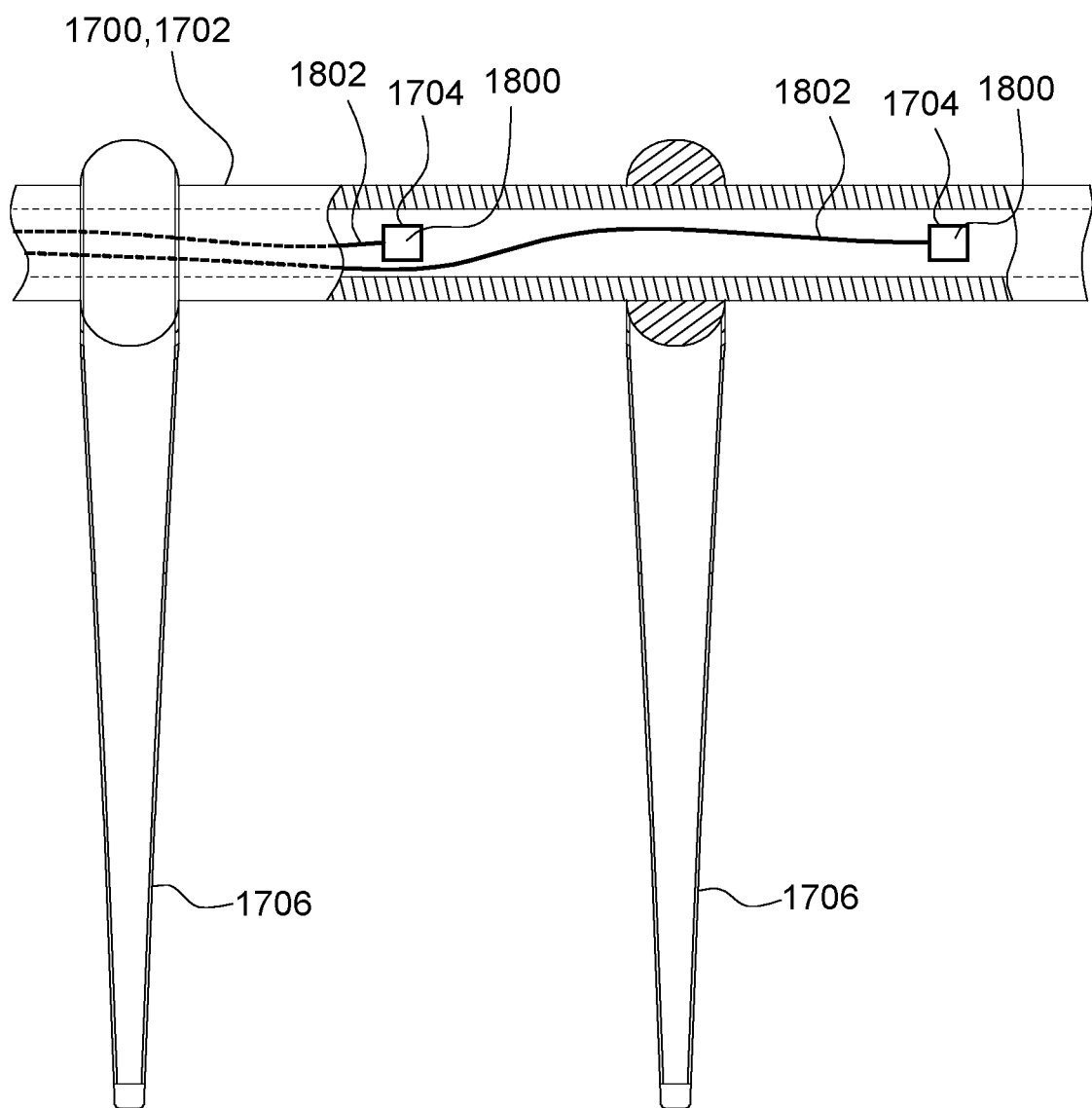
FIG. 18 is a partial cross-sectional view of a detailed portion of an example bat tube, according to some implementations of the present disclosure.

FIGS. 17 and 18 illustrates another implementation in which illumination is provided from a bat tube as opposed to one or more reel fingers coupled to the bat tube. FIG. 17 is a detail view of a portion of an example reel 1700. More particularly, FIG. 17 shows a detail view of an example bat tube 1702 of the example reel 1700 in which illumination provided from a plurality of apertures 1704 formed in the bat tube 1702. In the illustrated example, each of the apertures is disposed between adjacent reel fingers 1706. In other implementations, additional apertures emitting illumination therefrom may be provided between adjacent reel fingers 1706. In some instances, a distribution of apertures between adjacent reel fingers 1706 varies. For example, an aperture between one set of adjacent reel fingers may be omitted; a plurality of apertures between another set of adjacent reel fingers is provided; while, a single aperture is provided between another set of adjacent reel fingers. Still further, in some implementations, a light source, such as an LED, is disposed in or adjacent to each aperture 1704. In other implementations, light is distributed to each of the apertures via an optical component, such as a light pipe or optical fiber. In some instance, light is provided to an aperture 1704 via a separate optical component. In other instances, light is provided to one or more of the apertures 1704 via a common optical component.

The apertures 1704 are oriented such that apertures 1704 are directed downwardly towards the ground. In this configuration, as a result of an orientation of the bat tube 1702 being approximately constant as the reel rotates, illumination released from the apertures 1704 is directed towards, for example, a cutterbar of a draper head, a portion of an endless belt of the draper header, an area adjacent to the draper header, a combination of these, or towards another location.

FIG. 18 is a partial cross-sectional view of a detailed portion of the bat tube 1702. In this example, a light source 1800 is disposed at each aperture 1704. An electrical connection 1802 extends from each light source 1800 to a power supply, which may be of a type described herein or that is otherwise within the scope of the present disclosure.

In still other implementations, the bat tube 1702 excludes the apertures 1704, and light sources are applied directly to an exterior surface of the bat tube 1702. In some instances, an electrical connection extends fully or partially along the exterior surface of the bat tube 1702 to a power source, for example. In other implementations, the electrical connection for the light source extends through a wall of the bat tube 1702 and through an interior thereof to a power source, for example.

The present disclosure also provides for selectively illumination from a reel of an draper header based on a movement of the reel and, more particularly, how a part of the reel from which illumination is released changes relative to a cab of an agricultural vehicle carrying the draper header.

Figure 19:
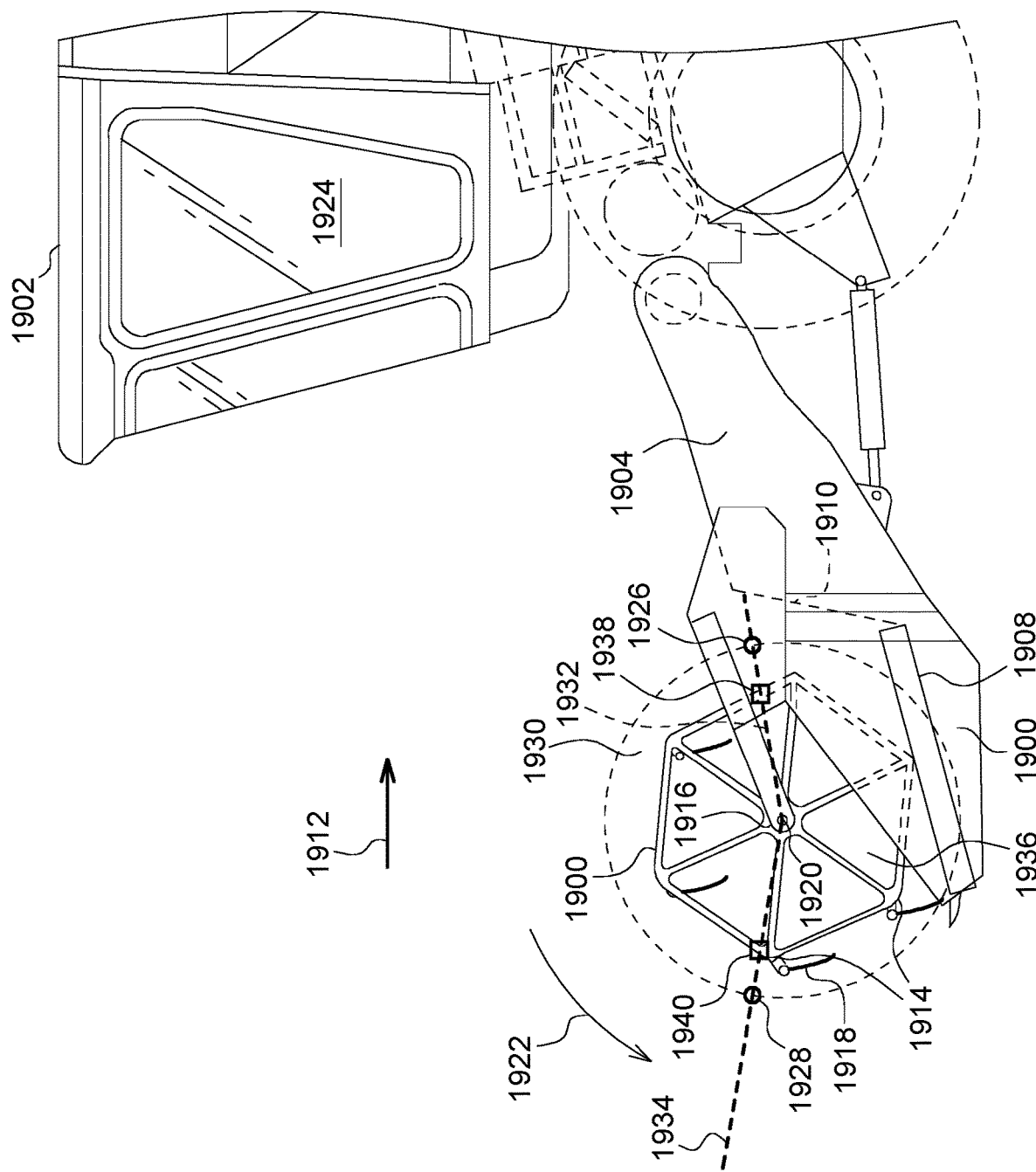
FIG. 19 is a side view an example draper header attached to a combine harvester, according to some implementations of the present disclosure.

FIG. 19 is a side view an example draper header 1900 attached to a combine harvester 1902. The draper header 1900 is attached to a feederhouse 1904 of the combine harvester 1902. The draper header 1900 includes a reel 1906, an endless belt 1908 that transports severed crop material for intake into the feederhouse 1904, and a back sheet 1910. The back sheet 1910 defines a wall that confines movement of the severed crop material in an aft direction indicated by arrow 1912. The back sheet 1910 is provided to prevent movement of the severed crop material therebeyond. The reel 1906 includes bat tubes 1914 that are radially offset from a center tube 1916. Reel fingers 1918 are coupled to the bat tubes 1914 in a manner described herein, for example.

In operation, such as when the draper header 1900 is harvesting crop, the reel 1906 rotates about axis 1920 in a direction indicated by arrow 1922. In order to avoid distracting glare from illumination provided by the reel 1900, such as via one or more reel fingers 1918, the bat tubes 1914, or from another portion thereof, being projected towards an operator in a cab 1924 of the combine harvester 1902, the illumination provided by the reel 1900 is selectively released based on a position of a location of a portion of the reel 1900 from which light is released as the reel 1900 rotates about the axis 1920. Selective release of the illumination includes, for example, selectively activating and deactivating light sources, opening and closing apertures through which light released, or in other ways. The present example is made in the context of activating and deactivating one or more light sources. However, selectively providing illumination may be accomplished in other ways.

As the reel 1900 rotates, when a portion of the reel 1900 reaches a first location 1926, illumination from that portion of the reel 1900 is ceased or otherwise deactivated. Illumination from this portion of the reel 1900 remains inactive until that portion of the reel 1900 reaches a second location 1928, at which time illumination is reactivated or otherwise resumes from that portion of reel 1900. Consequently, in a first region 1930 defined between lines 1932 and 1934 extending from axis 1920 through the first and second locations 1926 and 1928, respectively, the reel 1900 does not emit illumination. In a second region 1936, also defined between lines 1932 and 1934, the reel 1900 does emit illumination.

Although FIG. 19 shows two regions 1930 and 1936, in other implementations, there may be numerous regions. For example, in some implementations, two or more illumination regions or two or more nonillumination regions may be provided.

In some implementations, a first sensor 1938 detects a position of reel about axis 1920. In some implementations, the sensor 1938 senses when a bat tube or other part of the reel reaches the first location 1926. The first sensor 1938 produces a signal that causes illumination being released from the detected portion of the reel 1900 to cease. For example, the produced signal causes light sources associated with the detected portion of the reel to be deactivated, thereby eliminating illumination release from that portion of the reel 1900. A second sensor 1940 senses when a portion of the reel reaches the second location 1934 and generates a signal that cause illumination from that portion of the reel 1900 to resume.

In some implementations, a single sensor is uses, along with a speed of the reel, to selectively activate and deactivate production of illumination by different portions of the reel. For example, sensor 1938 detects a location of different portions of the reel and produces a signal that ceases illumination form those portions of the reel. Using the speed of rotation of the reel 1900 and knowing a desired location where illumination is to be resumed, the illumination from the portions of the reel 1900 where illumination has been ceased can be resumed based on a time that has transpired since illumination was ceased and the rotational speed of the reel 1900. In still other implementations, a rotational speed of the reel 1900 along with indexing movement of the reel 1900 is used to selectively activate and deactivate illumination from different parts of the reel 1900.

Still further, in some implementations, a switch is used to selectively activate and deactivate release of illumination from different parts of a reel, such as by selectively activating and deactivating light sources. For example, a switch that activates and deactivates a light source such as by a change in an orientation of the switch can be used. Example switches include a tilt switch. Implementations that include one or more switches of this type reduce complexity, such as by avoiding the use of a control system to control selectively providing and halting the production of light from a reel.

Figure 20:
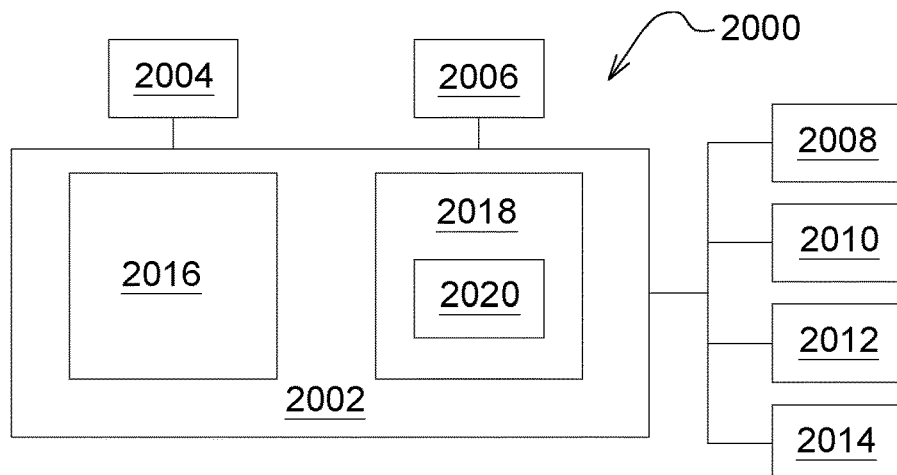
FIG. 20 is a schematic diagram of an example control system for selectively starting and stopping release of illumination from different parts of a reel, according to some implementations of the present disclosure.

FIG. 20 is a schematic diagram of an example control system 2000 for selectively starting and stopping release of illumination from different parts of a reel. The control system 2000 includes an electronic controller 2002, sensors 2004 and 2006 that detect a position of a reel, and a plurality of light sources 2008 through 2014. Although two sensors 2004 and 2006 are provided in the example of FIG. 20, in other implementations, fewer or additional sensor can be used. Further, although four light sources 2008 through 2014 are shown, fewer or additional light sources may be used in other implementations. Further, in other implementations, rather than light sources, selectively openable ports or apertures or other features that selectively permit light to pass can be use. In some instances, the electronic controller 2002 is or includes a computer system, such as computer system 1400, described in more detail below. The electronic controller 2002 includes a processor 2016 and a memory 2018. The memory 2018 communicates with the processor 2016 and is used to store programs and other software, information, and data. The processor 2016 is operable to execute programs and software and receive information from and send information to the memory 2018. Although a single memory 2018 and a single processor 2016 are illustrated, in other implementations, a plurality of memories, processors, or both may be used. Although the processor 2016 and the memory 2018 are shown as being local components of the electronic controller 2002, in other implementations, one or both of the processor 2016 and memory 2018 may be located remotely. Software 2020, such as in the form of an application or program, is executed by the processor 2016 to control operation of the system 2000, as described in more detail below.

In operation, the sensor 2004 senses a portion of a reel associated with light source 2008, for example, as the portion of the reel moves past the sensor 2004. In response the sensor 2004 generates a signal that is transmitted to the electronic controller 2002 via a wired or wireless connection. In some implementations, the signal includes an identifier that identifies the portion of the reel to the exclusion of other portions of the reel. In response, electronic controller 2002 transmits a signal to a light source associated with that portion of the reel that causes the light source to be deactivated and, thus, stop producing light. In this instance, the light source 2008 corresponds to the portion of the reel that has been sensed. As the reel continues to move, the sensed portion of the reel move past the second sensor 2006, causing the sensor 2006 to generate a signal identifying the particular part of the reel. In response, the electronic controller 2002 receives the signal and activates the light source 2008. The operation is similar for each portion of the reel associated with light sources 2010 through 2014.

In other implementations, the sensors 2004 and 2006 may be eliminated and a different sensor that senses a speed of the reel may be included to provide a rotational speed of the reel to the electronic controller 2002. The electronic controller 2002 may also include or receive indexing information that provides the electronic controller 2002 with information that identifies where different portions of the reel are located at any particular time. Using this information, the electronic controller 2002 can selectively activate and deactivate the different light sources to provide illumination at a first selected area, such as at a front a header (such as where a cutterbar is located) and cease illumination at another area, such as an area where the produced illumination is projected towards an operator.

Figure 21:
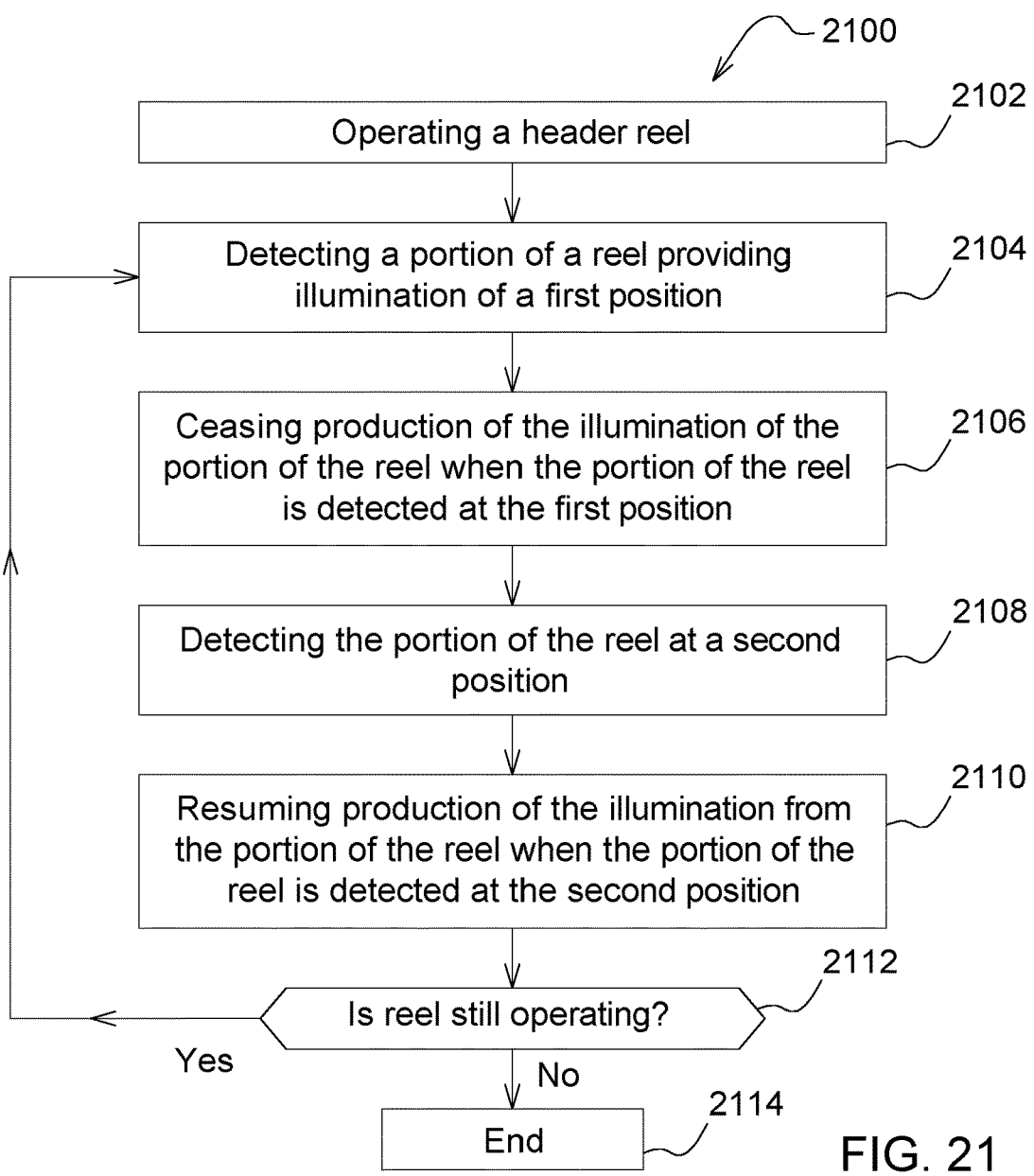
FIG. 21 is an example method for selectively providing illumination from a header reel, according to some implementations of the present disclosure.

FIG. 21 is an example method 2100 for selectively providing illumination from a header reel. At 2102, a reel of a header is operated. At 2104, a portion of the reel providing illumination is detected at a first position. At 2106, the illumination being produced by the portion of the reel is stopped, such as be deactivating one or more light sources or closing one or more apertures, when the portion of the reel is detected at the first position. At 2108, the portion of the reel is detected at a second partition, and, at 2110, the production of illumination form the portion of the reel is resumed when the portion of the reel is detected at the second position. At 2112, a determination is made as to whether the reel is continuing to operate. If the reel is continuing to operate, the method 2100 returns to 2104. If the reel is no longer operating, then the method 2100 stops at 2114.

Figure 14:
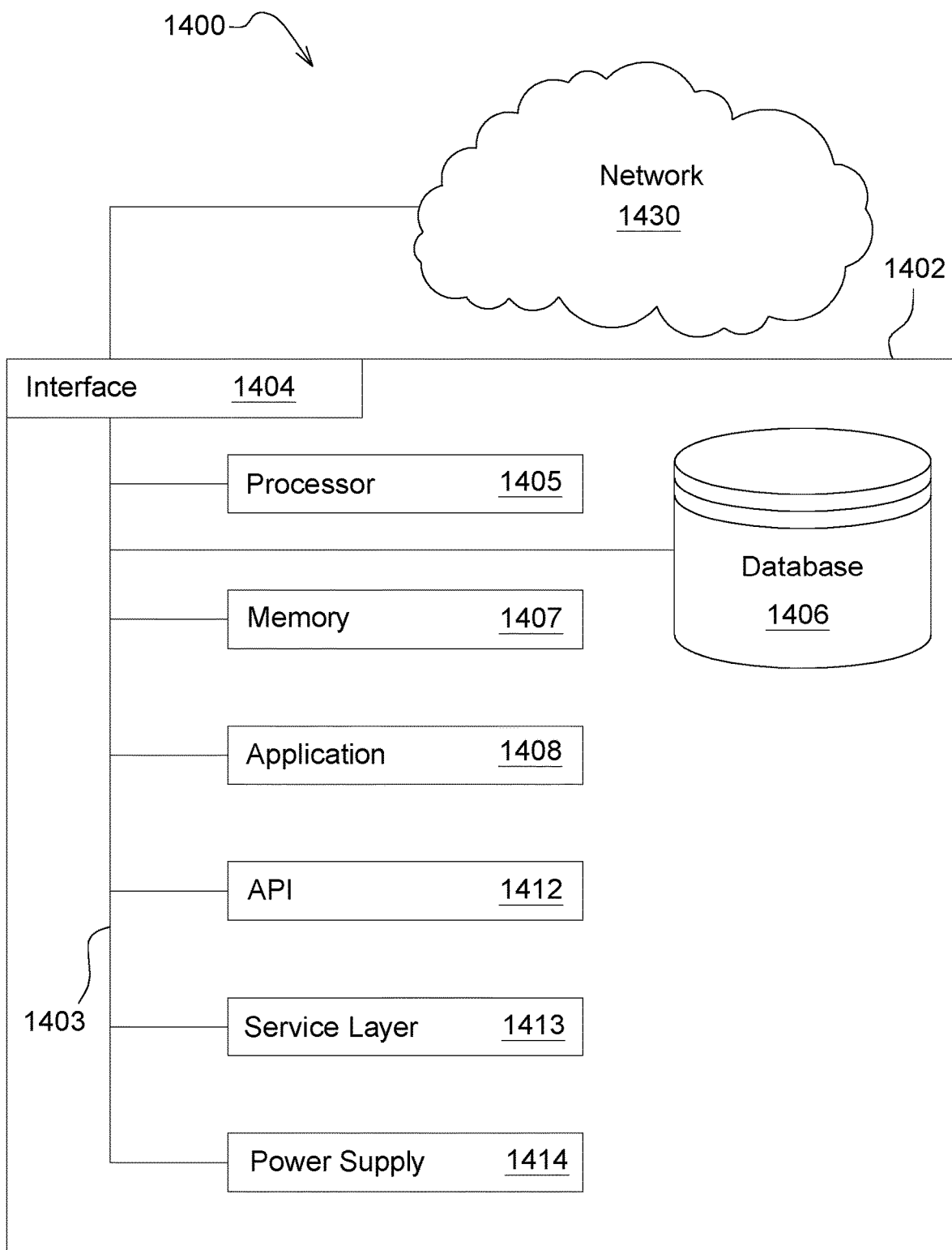
FIG. 14 is a block diagram illustrating an example computer system used to provide computational functionalities associated with described algorithms, methods, functions, processes, flows, and procedures as described in the present disclosure, according to some implementations of the present disclosure.

FIG. 14 is a block diagram of an example computer system 1400 used to provide computational functionalities associated with described algorithms, methods, functions, processes, flows, and procedures described in the present disclosure, according to some implementations of the present disclosure. The illustrated computer 1402 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 1402 can include input devices such as keypads, keyboards, and touch screens that can accept user information. Also, the computer 1402 can include output devices that can convey information associated with the operation of the computer 1402. The information can include digital data, visual data, audio information, or a combination of information. The information can be presented in a graphical user interface (UI) (or GUI).

The computer 1402 can serve in a role as a client, a network component, a server, a database, a persistency, or components of a computer system for performing the subject matter described in the present disclosure. The illustrated computer 1402 is communicably coupled with a network 1430. In some implementations, one or more components of the computer 1402 can be configured to operate within different environments, including cloud-computing-based environments, local environments, global environments, and combinations of environments.

At a high level, the computer 1402 is an electronic computing device operable to receive, transmit, process, store, and manage data and information associated with the described subject matter. According to some implementations, the computer 1402 can also include, or be communicably coupled with, an application server, an email server, a web server, a caching server, a streaming data server, or a combination of servers.

The computer 1402 can receive requests over network 1430 from a client application (for example, executing on another computer 1402). The computer 1402 can respond to the received requests by processing the received requests using software applications. Requests can also be sent to the computer 1402 from internal users (for example, from a command console), external (or third) parties, automated applications, entities, individuals, systems, and computers.

Each of the components of the computer 1402 can communicate using a system bus 1403. In some implementations, any or all of the components of the computer 1402, including hardware or software components, can interface with each other or the interface 1404 (or a combination of both), over the system bus 1403. Interfaces can use an application programming interface (API) 1412, a service layer 1413, or a combination of the API 1412 and service layer 1413. The API 1412 can include specifications for routines, data structures, and object classes. The API 1412 can be either computer-language independent or dependent. The API 1412 can refer to a complete interface, a single function, or a set of APIs.

The service layer 1413 can provide software services to the computer 1402 and other components (whether illustrated or not) that are communicably coupled to the computer 1402. The functionality of the computer 1402 can be accessible for all service consumers using this service layer. Software services, such as those provided by the service layer 1413, can provide reusable, defined functionalities through a defined interface. For example, the interface can be software written in JAVA, C++, or a language providing data in extensible markup language (XML) format. While illustrated as an integrated component of the computer 1402, in alternative implementations, the API 1412 or the service layer 1413 can be stand-alone components in relation to other components of the computer 1402 and other components communicably coupled to the computer 1402. Moreover, any or all parts of the API 1412 or the service layer 1413 can be implemented as child or sub-modules of another software module, enterprise application, or hardware module without departing from the scope of the present disclosure.

The computer 1402 includes an interface 1404. Although illustrated as a single interface 1404 in FIG. 14, two or more interfaces 1404 can be used according to particular needs, desires, or particular implementations of the computer 1402 and the described functionality. The interface 1404 can be used by the computer 1402 for communicating with other systems that are connected to the network 1430 (whether illustrated or not) in a distributed environment. Generally, the interface 1404 can include, or be implemented using, logic encoded in software or hardware (or a combination of software and hardware) operable to communicate with the network 1430. More specifically, the interface 1404 can include software supporting one or more communication protocols associated with communications. As such, the network 1430 or the interface's hardware can be operable to communicate physical signals within and outside of the illustrated computer 1402.

The computer 1402 includes a processor 1405. Although illustrated as a single processor 1405 in FIG. 14, two or more processors 1405 can be used according to particular needs, desires, or particular implementations of the computer 1402 and the described functionality. Generally, the processor 1405 can execute instructions and can manipulate data to perform the operations of the computer 1402, including operations using algorithms, methods, functions, processes, flows, and procedures as described in the present disclosure.

The computer 1402 also includes a database 1406 that can hold data for the computer 1402 and other components connected to the network 1430 (whether illustrated or not). For example, database 1406 can be an in-memory, conventional, or a database storing data consistent with the present disclosure. In some implementations, database 1406 can be a combination of two or more different database types (for example, hybrid in-memory and conventional databases) according to particular needs, desires, or particular implementations of the computer 1402 and the described functionality. Although illustrated as a single database 1406 in FIG. 14, two or more databases (of the same, different, or combination of types) can be used according to particular needs, desires, or particular implementations of the computer 1402 and the described functionality. While database 1406 is illustrated as an internal component of the computer 1402, in alternative implementations, database 1406 can be external to the computer 1402.

The computer 1402 also includes a memory 1407 that can hold data for the computer 1402 or a combination of components connected to the network 1430 (whether illustrated or not). Memory 1407 can store any data consistent with the present disclosure. In some implementations, memory 1407 can be a combination of two or more different types of memory (for example, a combination of semiconductor and magnetic storage) according to particular needs, desires, or particular implementations of the computer 1402 and the described functionality. Although illustrated as a single memory 1407 in FIG. 14, two or more memories 1407 (of the same, different, or combination of types) can be used according to particular needs, desires, or particular implementations of the computer 1402 and the described functionality. While memory 1407 is illustrated as an internal component of the computer 1402, in alternative implementations, memory 1407 can be external to the computer 1402.

The application 1408 can be an algorithmic software engine providing functionality according to particular needs, desires, or particular implementations of the computer 1402 and the described functionality. For example, application 1408 can serve as one or more components, modules, or applications. Further, although illustrated as a single application 1408, the application 1408 can be implemented as multiple applications 1408 on the computer 1402. In addition, although illustrated as internal to the computer 1402, in alternative implementations, the application 1408 can be external to the computer 1402.

The computer 1402 can also include a power supply 1414. The power supply 1414 can include a rechargeable or non-rechargeable battery that can be configured to be either user- or non-user-replaceable. In some implementations, the power supply 1414 can include power-conversion and management circuits, including recharging, standby, and power management functionalities. In some implementations, the power-supply 1414 can include a power plug to allow the computer 1402 to be plugged into a wall socket or a power source to, for example, power the computer 1402 or recharge a rechargeable battery.

There can be any number of computers 1402 associated with, or external to, a computer system containing computer 1402, with each computer 1402 communicating over network 1430. Further, the terms "client," "user," and other appropriate terminology can be used interchangeably, as appropriate, without departing from the scope of the present disclosure. Moreover, the present disclosure contemplates that many users can use one computer 1402 and one user can use multiple computers 1402.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

Wireless connections within the scope of the present disclosure include wireless protocols, such as, 802.15 protocols (e.g., a BLUETOOTH®), 802.11 protocols, 802.20 protocols (e.g., WI-FI®), or a combination of different wireless protocols.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

Without in any way limiting the scope, interpretation, or application of the claims appearing below, a technical effect of one or more of the example implementations disclosed herein is providing illumination to one or more portions of a draper header or another area during nighttime agricultural operations or agricultural operations occurring during low ambient light levels. Another technical effect of one or more of the example implementations disclosed herein is to improve situational awareness and safety of nighttime agricultural operations or agricultural operations occurring during low ambient light levels.

While the above describes example implementations of the present disclosure, these descriptions should not be viewed in a limiting sense. Rather, other variations and modifications may be made without departing from the scope and spirit of the present disclosure as defined in the appended claims.

What is claimed is:

1. A method of selectively providing illumination from a header reel, the method comprising:
providing illumination from a portion of a header reel during a first amount of a rotation of the header reel; and
stopping illumination from the portion of the header during a second amount of rotation of the header reel while the header is harvesting crop.

2. The method of claim 1, wherein providing illumination from a portion of a header reel during a first amount of a rotation of the header reel comprises:
identifying when the portion of a header reel reaches a selected position; and
releasing at least a portion of the illumination from the header reel when the portion of header reel reaches the selected position.

3. The method of claim 1, wherein stopping illumination from the portion of the header during a second amount of rotation of the header reel comprises:
identifying when a portion of the header reel reaches a selected position; and
stopping release of at least a portion of the illumination from the header reel when the portion of the header reel reaches the selected position.

4. The method of claim 1, wherein the header reel comprises a tilt switch, and
wherein providing illumination from a portion of a header reel during a first amount of a rotation of the header reel comprises providing illumination when the tilt switch attains a first orientation; and
wherein stopping illumination from the portion of the header during a second amount of rotation of the header reel comprises stopping illumination when the tilt switch attains a second orientation, different from the first orientation.

5. The method of claim 1, wherein providing illumination from a portion of a header reel during a first amount of a rotation of the header reel comprises identifying when the portion of a header reel reaches a selected position and releasing illumination from the header reel when the portion of the header reel is detected at the selected position.

6. The method of claim 5, wherein stopping illumination from the portion of the header during a second amount of rotation of the header reel comprises stopping illumination when a selected amount of rotation of the header reel has occurred.

7. The method of claim 1, wherein stopping illumination from the portion of the header during a second amount of rotation of the header reel comprises identifying when a portion of the reel header reaches a selected position, and stopping release of the illumination from the header reel when the portion of the header reel is detected at the selected position.

8. A method of selectively providing illumination from a header reel, the method comprising:
providing illumination from a portion of a header reel during a first amount of a rotation of the header reel; and
stopping illumination from the portion of the header during a second amount of rotation of the header reel;
wherein the illumination is released from a bat tube of the header reel.

9. The method of claim 8, wherein the illumination is released from a light source provided on a bat tube of the header reel.

10. A method of selectively providing illumination from a header reel, the method comprising:
providing illumination from a portion of a header reel during a first amount of a rotation of the header reel; and
stopping illumination from the portion of the header during a second amount of rotation of the header reel;
wherein the illumination is released from a reel finger of the header reel.

11. The method of claim 10, wherein the illumination is released from an aperture formed in the reel finger.

12. The method of claim 10, wherein the illumination is released along a length of the reel finger.

13. The method of claim 10, wherein the illumination is released from an optical component of the reel finger.

14. The method of claim 13, wherein the optical component is a light pipe.

15. The method of claim 1, wherein providing illumination from a portion of a header reel during a first amount of a rotation of the header reel comprises providing illumination from a light source provided in a bat tube of the header reel.

* * * * *